(12) United States Patent  
Komma et al.

(10) Patent No.: US 8,259,551 B2  
(45) Date of Patent: Sep. 4, 2012

(54) OPTICAL RECORDING MEDIUM, MANUFACTURING METHOD FOR OPTICAL RECORDING MEDIUM, INFORMATION RECORDING/REPRODUCING METHOD AND INFORMATION RECORDING/REPRODUCING DEVICE

(75) Inventors: Yoshiaki Komma, Osaka (JP); Joji Anzai, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/236,812

(22) Filed: Sep. 20, 2011

(65) Prior Publication Data

US 2012/0011523 A1 Jan. 12, 2012

Related U.S. Application Data

(63) Continuation of application No. 12/269,289, filed on Nov. 12, 2008, now abandoned.

(51) Int. Cl.  
*G11B 7/00* (2006.01)

(52) U.S. Cl. ........................................................ 369/94

(58) Field of Classification Search ................. None  
See application file for complete search history.

(56) References Cited

U.S. PATENT DOCUMENTS

| | | | |
|---|---|---|---|
| 6,625,099 B2 | 9/2003 | Nakano | |
| 2002/0027842 A1 | 3/2002 | Komma et al. | |
| 2003/0161254 A1 | 8/2003 | Blankenbeckler et al. | |
| 2004/0139459 A1 | 7/2004 | Mishima | |
| 2004/0246870 A1 | 12/2004 | Kim et al. | |
| 2006/0062133 A1 | 3/2006 | Tsukagoshi et al. | |
| 2006/0114799 A1 | 6/2006 | Martens et al. | |
| 2006/0198259 A1 | 9/2006 | Yumita | |
| 2007/0171781 A1 | 7/2007 | Imai et al. | |
| 2008/0106997 A1* | 5/2008 | Kanai et al. | 369/112.23 |
| 2008/0109837 A1 | 5/2008 | Anzai et al. | |
| 2008/0219131 A1* | 9/2008 | Hendriks et al. | 369/112.23 |
| 2009/0028027 A1 | 1/2009 | Anzai et al. | |
| 2009/0190461 A1 | 7/2009 | Van Der Mark et al. | |
| 2009/0303864 A1 | 12/2009 | Nagata et al. | |

(Continued)

FOREIGN PATENT DOCUMENTS

CN 1828739 9/2006

(Continued)

OTHER PUBLICATIONS

Office Action mailed Sep. 30, 2011 in corresponding U.S. Appl. No. 12/995,217.

(Continued)

*Primary Examiner* — Peter Vincent Agustin  
*Assistant Examiner* — Emily Frank  
(74) *Attorney, Agent, or Firm* — Wenderoth, Lind & Ponack, L.L.P.

(57) ABSTRACT

An optical recording medium (disk) capable of preventing a back focus at a face thereof and reducing the interference between beams reflected by each recording surface, thereby improving a quality of a servo signal and a reproductive signal. In a disk having (N−1) layers, if N is a natural number (more than three), and if a cover-layer thickness and intermediate-layer thicknesses are d1, d2, . . . dN, then a difference of 1 μm or above is set between the sum of di to dj and the sum of dk to dm for arbitrary natural numbers i, j, k, m ($i \leq j \leq k \leq m \leq N$). If refractive indexes are different from a standard value or different for each layer, then the thickness of each layer is converted based on a spread width of light according to the thickness.

4 Claims, 9 Drawing Sheets

U.S. PATENT DOCUMENTS

| | | |
|---|---|---|
| 2010/0034067 A1 | 2/2010 | Kikukawa et al. |
| 2010/0097913 A1 | 4/2010 | Kikukawa et al. |
| 2010/0110871 A1 | 5/2010 | Tsukuda |
| 2010/0149932 A1 | 6/2010 | Komma et al. |
| 2011/0078711 A1 | 3/2011 | Komma et al. |

FOREIGN PATENT DOCUMENTS

| | | |
|---|---|---|
| EP | 0 605 924 | 7/1994 |
| JP | 2001-155380 | 6/2001 |
| JP | 2004-213885 | 7/2004 |
| JP | 2006-73053 | 3/2006 |
| JP | 2008-117513 | 5/2008 |
| WO | 2006/013978 | 2/2006 |
| WO | 2008-015974 | 2/2008 |
| WO | 2008/129780 | 10/2008 |

OTHER PUBLICATIONS

Office Action issued Dec. 14, 2010 in corresponding Japanese Application No. 2010-537688 with English translation.

Supplementary European Search Report mailed Apr. 19, 2012 in corresponding European Application No. 09825900.5.

Blue-ray Disc Association, "White paper Blue-ray Disc 1.C Physical Format Specifications for BD-ROM $3^{rd}$ Edition", *Blue-ray Disc Association*, May 2005, pp. 0-34.

* cited by examiner

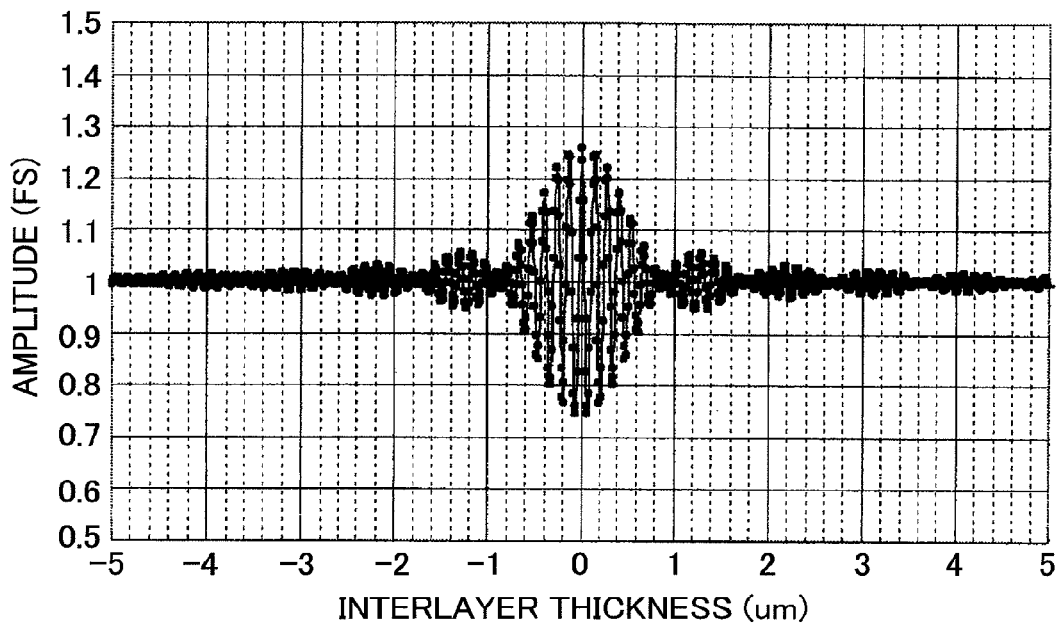

CONVERSION FROM SHAPE THICKNESS TO THICKNESS CORRESPONDING TO STANDARD REFRACTIVE-INDEX BASED ON DEFOCUS QUANTITY

OPTICAL RECORDING MEDIUM, MANUFACTURING METHOD FOR OPTICAL RECORDING MEDIUM, INFORMATION RECORDING/REPRODUCING METHOD AND INFORMATION RECORDING/REPRODUCING DEVICE

This is a continuation of U.S. application Ser. No. 12/269,289, filed Nov. 12, 2008, now abandoned.

BACKGROUND OF THE INVENTION

1. Field of the Invention

The present invention relates to an optical recording medium irradiated with light to record or reproduce information. Particularly, the present invention relates to a layer-interval structure of an optical recording medium having three or more information recording surfaces, and relates to a method or a device for reproducing information on the multilayer optical recording medium or recording information therein.

2. Description of the Background Art

A high-density and large-capacity optical information recording medium is currently known, for example, as an optical disk such as a DVD or a BD. The optical disk has recently become increasingly popular as a recording medium for recording an image, music or computer data. In order to increase the recording capacity, an optical recording medium having a plurality of recording layers has been offered, as described in Japanese Patent Laid-Open Publication No. 2001-155380 and/or Japanese Patent Laid-Open Publication No. 2008-117513.

FIG. 13 shows a conventional configuration of an optical recording medium and an optical pickup. A divergent beam 70 emitted from a light source 1: transmits a collimating lens 53 provided with a spherical-aberration correcting means 93; is incident upon a polarization beam splitter 52 and transmits it; transmits a quarter-wave plate 54 to convert into a circularly polarized beam; thereafter, is converted into a convergent beam by an objective lens 56; and transmits a transparent substrate of an optical recording medium 401 to concentrate upon any of recording surfaces 401a, 401b, 401c and 401d formed inside of the optical recording medium 401. The objective lens 56 is designed in such a way that the spherical aberration is zero in the middle depth position between the first recording surface 401a and the fourth recording surface 401d. The spherical-aberration correcting means 93 moves the collimating lens 53 in the optical-axis directions to thereby remove a spherical aberration generated when a beam converges upon each recording surface 401a, 401b, 401c, 401d.

The objective lens 56 is provided with an aperture portion 55 restricting the aperture thereof and has a numerical aperture NA of 0.85. The beam 70 reflected by the fourth recording surface 401d transmits the objective lens 56 and the quarter-wave plate 54 to convert into a linearly polarized beam different by an angle of 90 degrees from the outward path. Thereafter, the beam 70 is reflected by the polarization beam splitter 52; a condensing lens 59 is utilized to convert into a convergent beam; and the convergent beam is given an astigmatism through a cylindrical lens 57, so as to be incident upon a photodetector 320.

The photodetector 320 includes four light-receiving portions (not shown) each outputting an electric-current signal according to the quantity of received light. Each electric-current signal is used for generating a focus error (FE) signal in an astigmatism method, a tracking error (TE) signal in a push-pull method and an information (RF) signal recorded in the optical recording medium 401. The FE signal and the TE signal are amplified to a desired level and compensated for phase, and thereafter, are supplied to actuators 91 and 92 for focus and tracking control.

Herein, a problem arises if thicknesses t1 to t4 are all equal, as follows. For example, in order to execute recording and reproduction for the fourth recording surface 401d, the beam 70 is concentrated on there, and then, a part of the beam 70 is reflected by the third recording surface 401c. Since the distance between the third recording surface 401c and the fourth recording surface 401d is equal to the distance between the third recording surface 401c and the second recording surface 401b, the part of the beam 70 reflected by the third recording surface 401c forms an image on the back side of the second recording surface 401b, and the reflected beam by the second recording surface 401b is reflected again by the third recording surface 401c and gets mixed with a reflected beam from the fourth recording surface 401d which should be naturally read. Further, since the distance between the second recording surface 401b and the fourth recording surface 401d is also equal to the distance between the second recording surface 401b and a face 401z of the optical recording medium 401, a part of the beam 70 reflected by the second recording surface 401b forms an image on the back side of the face 401z of the optical recording medium 401, and the reflected beam by the face 401z is reflected again by the second recording surface 401b and gets mixed with the reflected beam from the fourth recording surface 401d which should be naturally read. This causes the problem of superimposing multiple reflected beams from images formed on the backsides of other layers on the reflected beam from the fourth recording surface 401d which should be naturally read to thereby hinder the recording/reproduction. The mixed beams tend to interfere and form a brightness distribution through interference on a light-receiving element, and the brightness distribution varies according to the change in the phase difference between the reflected beam from the fourth recording surface 401d and a reflected beam from another layer which is caused by a slight dispersion of intermediate-layer thicknesses inside of the face of an optical disk, thereby significantly deteriorating the quality of a servo signal and a reproductive signal. Below, this problem is referred to as a back-focus problem.

In order to prevent this back-focus problem, a method is disclosed of gradually lengthening the distance between each recording layer one by one from the face 401z of the optical recording medium 401 in such a way that no image is formed on the back side of the second recording surface 401b or the back side of the face 401z at the same time that the beam 70 is concentrated on the fourth recording surface 401d from which reading should be naturally executed (refer to Japanese Patent Laid-Open Publication No. 2001-155380). Herein, the thicknesses t1 to t4 each have a manufacturing dispersion of ±10 μm, and even if they are widely dispersed, each thickness t1 to t4 needs to have a different distance, thereby setting the difference in distance, for example, to 20 μm. In this case, t1=40 μm, t2=60 μm, t3=80 μm and t4=100 μm, then a total thickness t (=t2+t3+t4) from the first recording surface 401a to the fourth recording surface 401d becomes 240 μm.

If the thickness of a cover layer between the face and the first recording surface 401a is equal to the thickness between the fourth recording surface 401d and the first recording surface 401a, then a beam reflected by the fourth recording surface 401d is focused at the face and reflected from there, is reflected again by the fourth recording surface 401d, and thereafter, is led to the light-receiving portions. Because of the back focus at the face, this luminous flux does not have information such as a pit and a mark contained in a back-focus luminous flux on another recording layer. However, if there are a large number of recording layers, the quantity of light returning from the recording layers decreases to thereby heighten the reflectance of the face relatively. Accordingly, interference with a luminous flux on a reproduction layer occurs likewise, thereby significantly deteriorating the quality of a servo signal and a reproductive signal.

Taking the above problems into account, Japanese Patent Laid-Open Publication No. 2008-117513 suggests the distance between recording layers in an optical disk and discloses a structure as follows.

An optical recording medium includes four information recording surfaces as first to fourth information recording surfaces in order from the face of the optical recording medium. The distance between the face and the first information recording surface is 47 μm or below, and the intermediate-layer thickness between each information surface from the first information recording surface to the fourth information recording surface is a combination of 11-15 μm, 16-21 μm, and 22 μm or above. The distance between the face and the fourth information recording surface is 100 μm.

The distance between the face and the first information recording surface is 47 μm or below and the distance between the face and the fourth information recording surface is 100 μm.

In an optical disk system, a beam of light is incident upon the face of an optical disk and reflected by a recording surface, and the reflected beam is detected. Hence, an influence is also given by the refractive index of a transparent material transmitting the beam from the face to an optical-disk surface. In the disk structures of Japanese Patent Laid-Open Publication No. 2001-155380 and Japanese Patent Laid-Open Publication No. 2008-117513, however, neither an examination nor a description is given about the refractive index of a transparent material, and thus, an effect given by the refractive index is not considered at all.

BRIEF SUMMARY OF THE INVENTION

It is an object of the present invention to provide an optical disk (optical recording medium) capable of preventing a back focus at the face thereof and reducing the interference between beams reflected by each recording surface in consideration of a refractive index. Specifically, the optical disk includes a multilayer disk structure of three, four or more recording layers capable of widening the distance between the face and the recording layer closest to the face to the maximum.

The other objects, characteristics and superior points of the present invention will be sufficiently understood in the following description. Further, the advantages of the present invention will be obvious in the following description with reference to the attached drawings.

BRIEF DESCRIPTION OF THE DRAWINGS

FIG. 7 is a graphical representation showing a relationship between an FS-signal (light-quantity) amplitude and the difference in thickness between two interlayer distances of the optical recording medium.

FIG. 8 is a graphical representation showing a relationship between the substrate thickness of the optical recording medium and a jitter.

DETAILED DESCRIPTION OF THE PREFERRED EMBODIMENTS OF THE INVENTION

An optical recording medium according to each embodiment of the present invention will be described below with reference to the attached drawings.

First Embodiment

An embodiment of the present invention will be below described with reference to FIG. 1 and FIG. 2.

Figure 1:
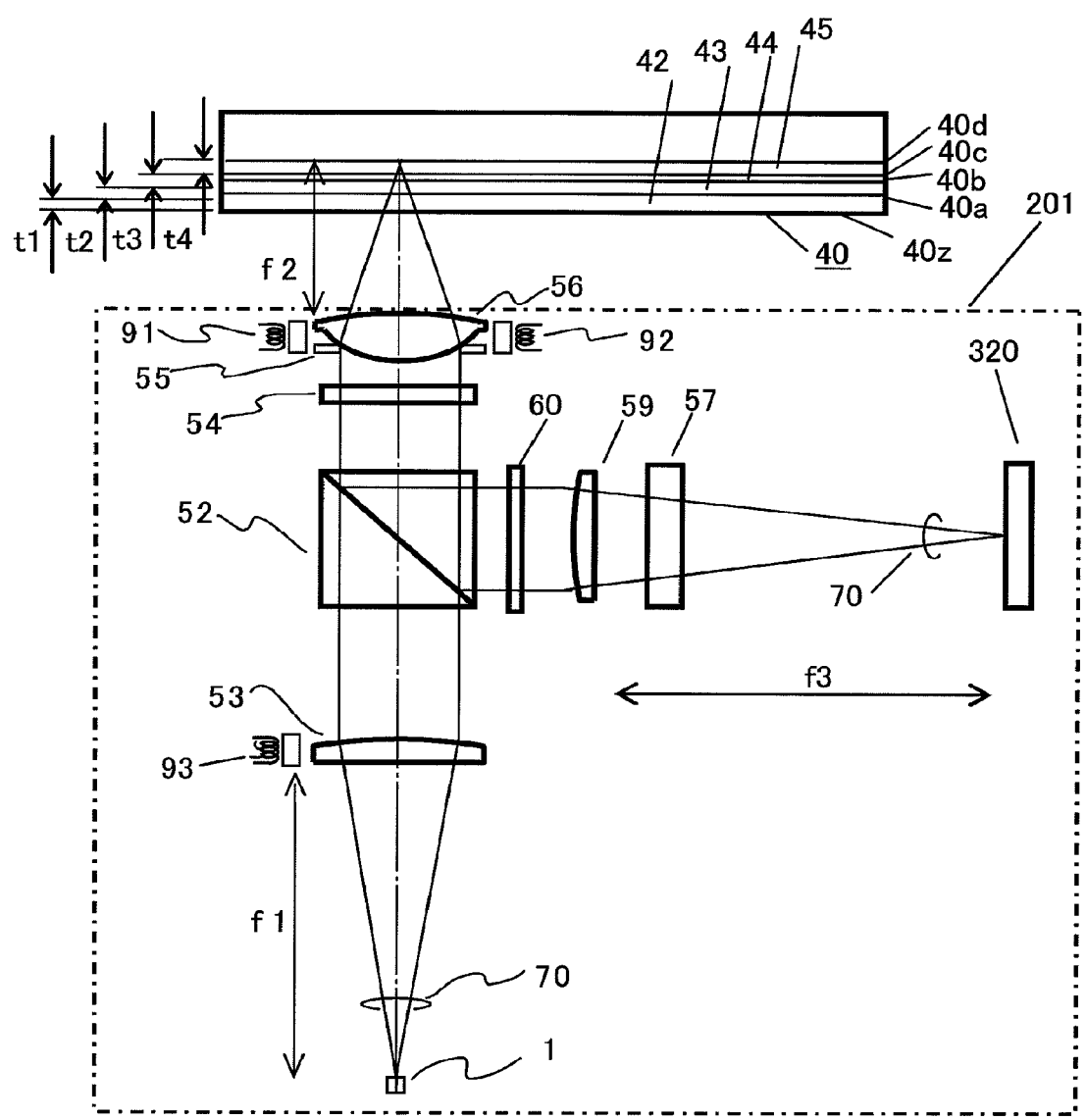
FIG. 1 is a schematic view showing a configuration of an optical recording medium and an optical pickup according to the present invention.
Figure 2:
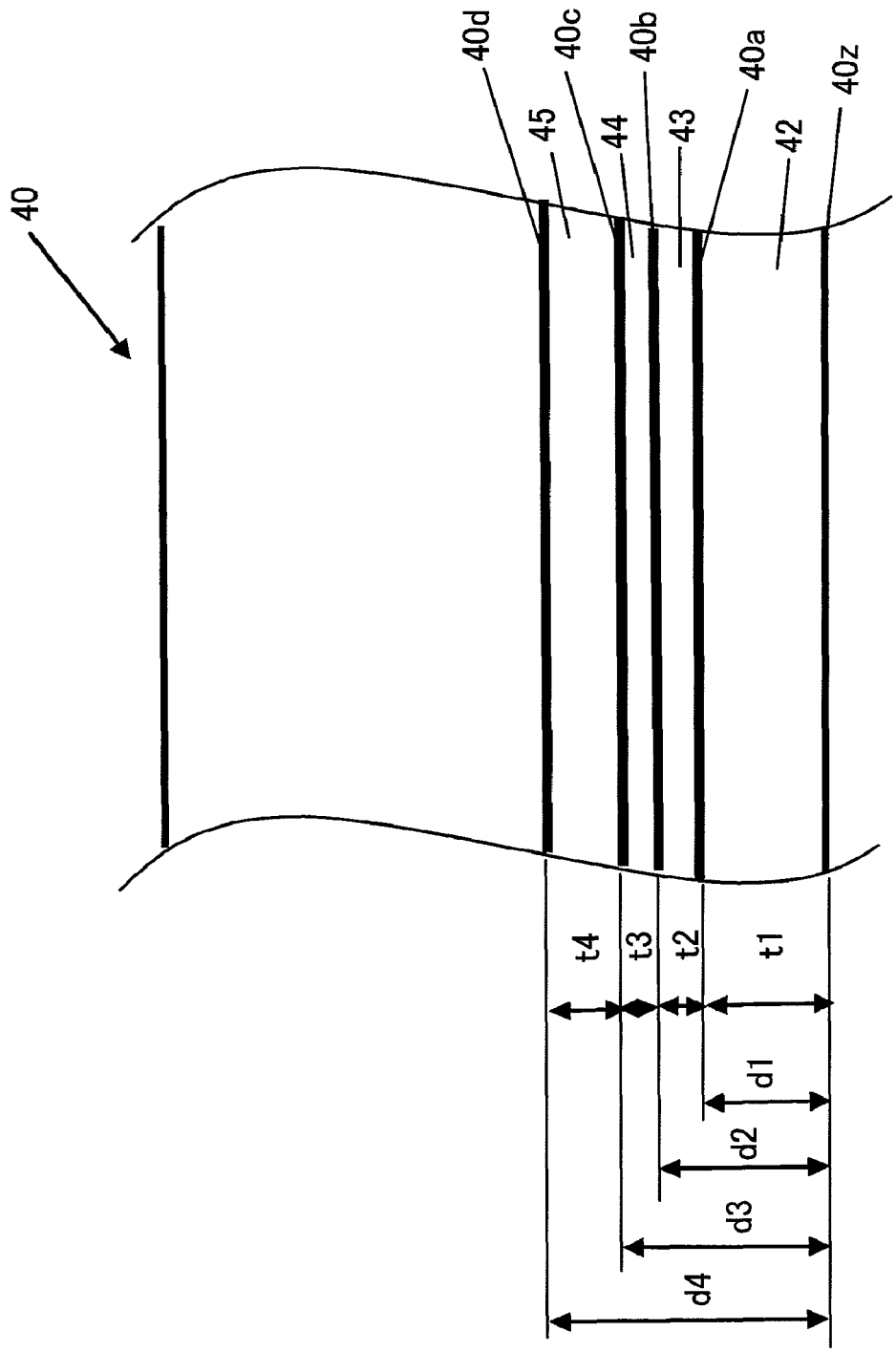
FIG. 2 is a schematic view showing a layer formation of the optical recording medium according to the present invention.

FIG. 1 shows a configuration of an optical information device according to the present invention. An optical pickup head unit 201 (or an optical pickup) irradiates an optical recording medium 40 with a blue laser beam having a wavelength λ of 405 nm or so, to thereby reproduce a signal recorded in the optical recording medium 40. The optical recording medium 40 is formed with, as an example, four information recording surfaces as first to fourth information recording surfaces 40a, 40b, 40c and 40d in order from the face of the optical recording medium 40, as shown in FIG. 2. The optical recording medium 40 is also formed with a cover layer 42, a first intermediate layer 43, a second intermediate layer 44 and a third intermediate layer 45. The thickness of the cover layer 42 (substrate from a face 40z to the first information recording surface 40a) is t1; the thickness of the first intermediate layer 43 (substrate from the first information recording surface 40a to the second information recording surface 40b) is t2; the thickness of the second intermediate layer 44 (substrate from the second information recording surface 40b to the third information recording surface 40c) is t3; and the thickness of the third intermediate layer 45 (substrate from the third information recording surface 40c to the fourth information recording surface 40d) is t4. Further, the distance between the face 40z and the first information recording surface 40a is d1 (≈t1); the distance between the face 40z and the second information recording surface 40b is d2 (≈t1+t2); the distance between the face 40z and the third information recording surface 40c is d3 (≈t1+t2+t3); and the distance between the face 40z and the fourth information recording surface 40d is d4 (≈t1+t2+t3+t4).

Figure 3:
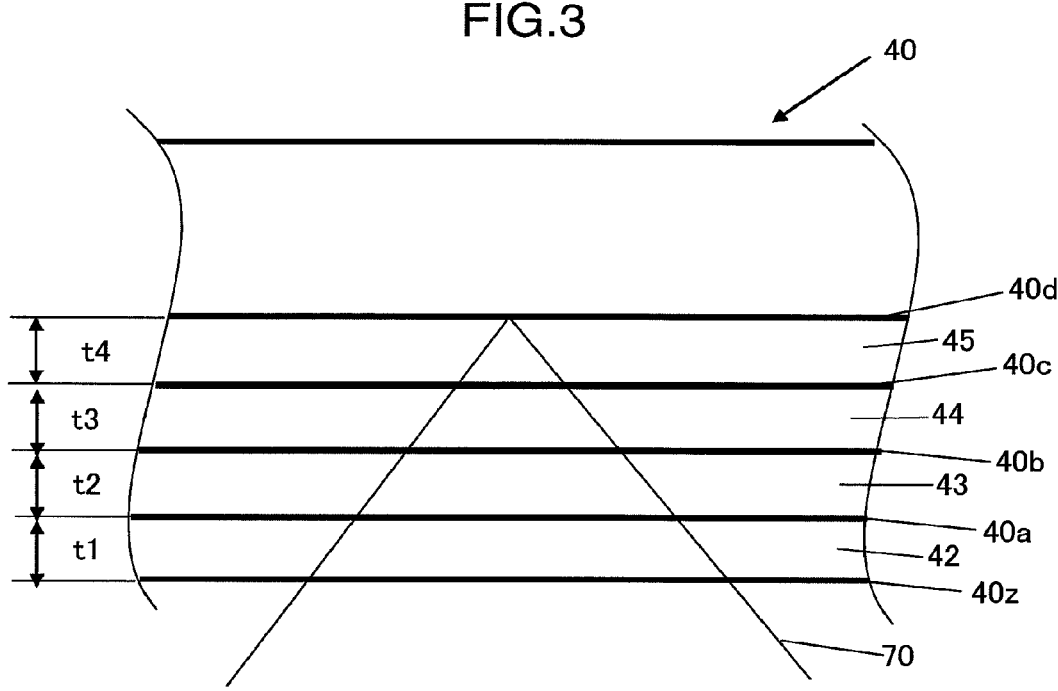
FIG. 3 is a schematic view showing the problems to be solved by the invention and a beam reflected by an information recording surface for recording and reproduction.
Figure 4:
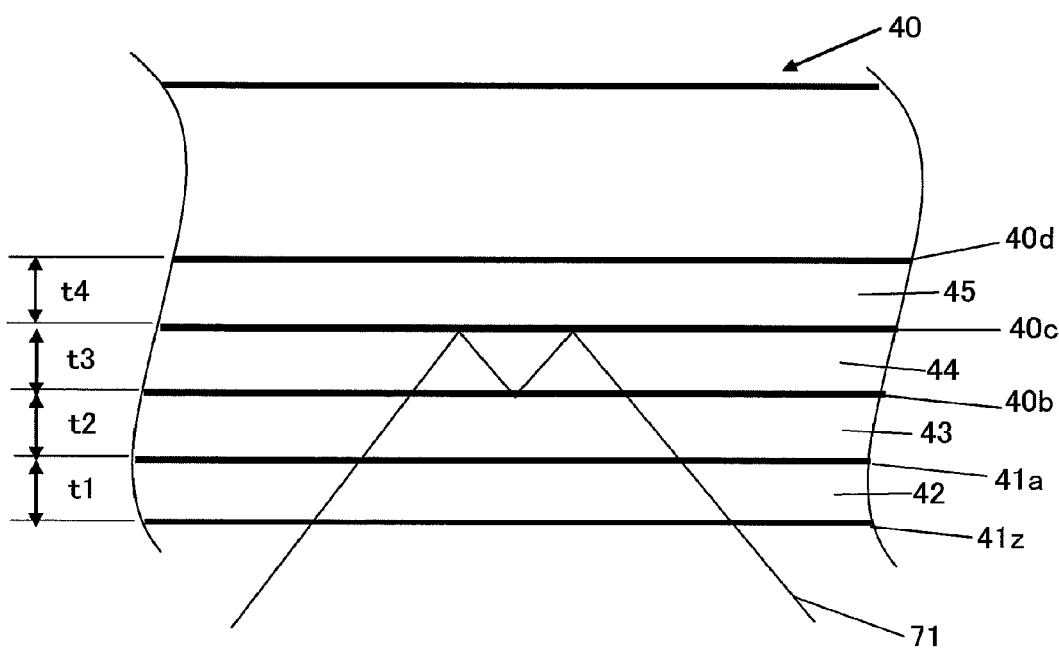
FIG. 4 is a schematic view showing the problems to be solved by the invention and a beam reflected by surfaces other than the information recording surface for recording and reproduction.
Figure 5:
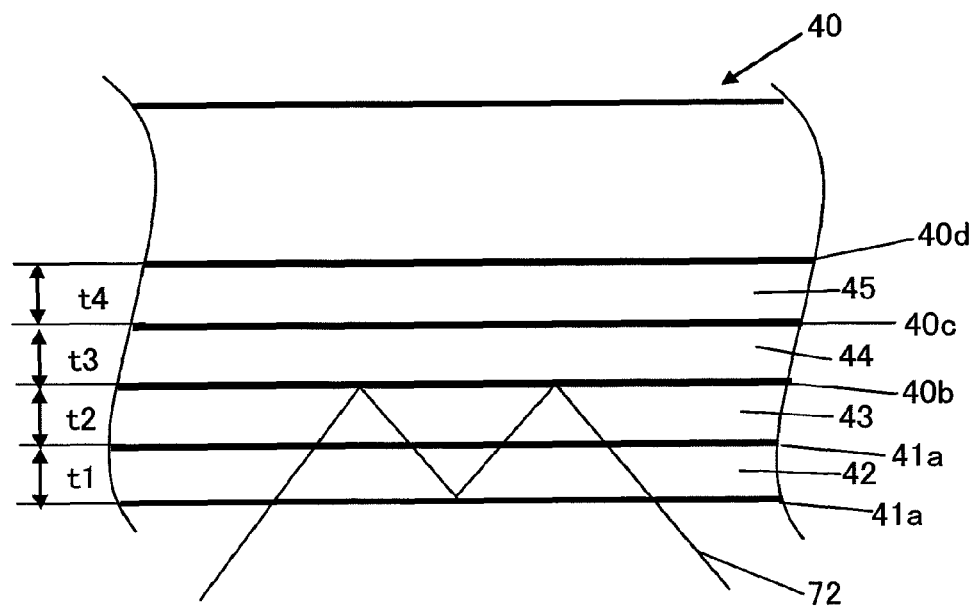
FIG. 5 is a schematic view showing the problems to be solved by the invention and a beam reflected by surfaces other than the information recording surface for recording and reproduction.
Figure 6:
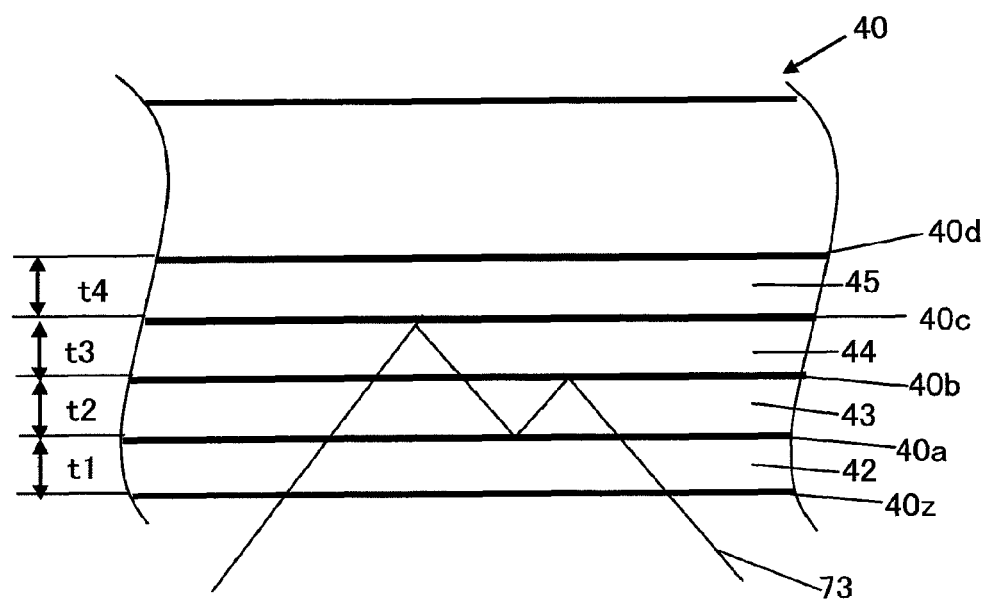
FIG. 6 is a schematic view showing the problems to be solved by the invention and a beam reflected by surfaces other than the information recording surface for recording and reproduction.

Herein, problems will be described in the case of four information recording surfaces. Firstly, interference caused by beams reflected from multiple surfaces will be explained with reference to FIGS. 3 to 7. A luminous flux concentrated for reproduction or recording shown in FIG. 3 branches off to several light beams as follows:

- a beam 70 concentrated on a reproduction or recording surface as shown in FIG. 3;
- a beam 71 (back-focus beam to a recording layer) reflected by the third information recording surface 40c, focused on the second information recording surface 40b and reflected from there, and reflected again by the third information recording surface 40c, as shown in FIG. 4;
- a beam 72 (back-focus beam to the face) reflected by the second information recording surface 40b, focused on the face and reflected from there, and reflected again by the second information recording surface 40b, as shown in FIG. 5; and
- a beam 73 reflected by the information recording surfaces 40c, 40a and 40b in this order without being focused on any information recording surface, as shown in FIG. 6.

To begin with, an examination is made of the case where the cover layer 42, the first intermediate layer 43, the second intermediate layer 44 and the third intermediate layer 45 all have the same refractive index i.e., a common refractive index no.

For example, if t4=t3, then upon being emitted from the face 40z, the beam 70 and the beam 71 pass along the same optical path and thereby are incident with the same flux diameter upon the photodetector 320. Similarly, if t4+t3=t2+t1, and if t2=t4, then upon being emitted from the face 40z, the beam 70 and the beam 72, and the beam 70 and the beam 73, respectively, pass along the same optical path and thereby are incident with the same flux diameter upon the photodetector 320. Herein, the beams 71 to 73, as multiple-surface reflected beams, are less intense than the beam 70. However, the contrast of interference depends upon not the intensity of light but the amplitude light-intensity ratio of light. The amplitude of light is equal to the square root of the intensity of light, thereby enlarging the contrast of interference even if there is a slight difference in the intensity of light. Upon being incident with the same flux diameter on the photodetector 320, beams are largely affected by interference, and thus, a slight change in the interlayer thickness significantly varies the quantity of light received by the photodetector 320, thereby making it hard to detect a stable signal.

FIG. 7 shows the FS-signal (total light-intensity) amplitude relative to the difference in the interlayer thickness if the light-intensity ratio of the beam 70 to the beam 71, the beam 72 or the beam 73 is 100:1 and the refractive indexes of the cover layer 42 and the first intermediate layer 43 are approximately 1.6 (1.57) equal to each other. The abscissa axis is the difference in the interlayer thickness and the ordinate axis is the FS-signal amplitude. Assuming that there is no reflection from multilayer light, the graph shows values obtained by normalizing only the beam 70 using the DC light quantity received by the photodetector 320. As can be seen from FIG. 7, the FS signal fluctuates sharply as the interlayer-thickness difference comes within approximately 1 μm.

In the same way as the beam 72 of FIG. 5, even when the difference between the thickness t1 of the cover layer 42 and the total thickness (t2+t3+t4) of the intermediate layers 43 to 45 becomes 1 μm or below, the problem arises such as fluctuations in the FS signal and the like.

As a second problem, if the interlayer distance between information recording surfaces is too narrow, the influence of crosstalk from each adjacent information recording surface is produced, thereby requiring that the interlayer distance should be set to a predetermined value or above. Accordingly, the interlayer thickness is studied to thereby determine a minimum interlayer thickness. FIG. 8 shows a relationship between the thickness between each recording layer in a disk whose recording layers have a reflectance substantially equal to each other and a jitter. The refractive indexes thereof are approximately 1.6. In FIG. 8, the abscissa axis is the thickness between layers and the ordinate axis is a jitter value. As the interlayer thickness narrows, the jitter deteriorates i.e., begins to increase from approximately 10 μm and rises sharply below this interlayer thickness, thereby meaning that 10 μm is most suitable as the minimum value of the interlayer thickness.

A configuration of the optical recording medium 40 according to the embodiment of the present invention will be described with reference to FIG. 2. In this embodiment, in order to solve an adverse effect by a beam reflected from another layer or the face, taking the dispersion of thicknesses in production into consideration, a four-layer disk structure is set to secure the following conditions.

Condition ①: securing 1 μm or above as the difference between the thickness t1 of the cover layer 42 and the total thickness (t2+t3+t4) of the intermediate layers 43 to 45. |t1−(t2+t3+t4)|≧1 μm.

Condition ②: securing 1 μm or above as the difference between any two values of t1, t2, t3 and t4.

Condition ③: securing 1 μm or above as the difference between the sum (t1+t2) of the thickness t1 of the cover layer 42 and the thickness t2 of the first intermediate layer 43 and the sum (t3+t4) of the thickness t3 of the second intermediate layer 44 and the thickness t4 of the third intermediate layer 45.

Although there are some other layer-thickness combinations, they are omitted because they need no considering when a thickness of a cover layer is set to a value approximate to t2+t3+t4.

Figure 9:
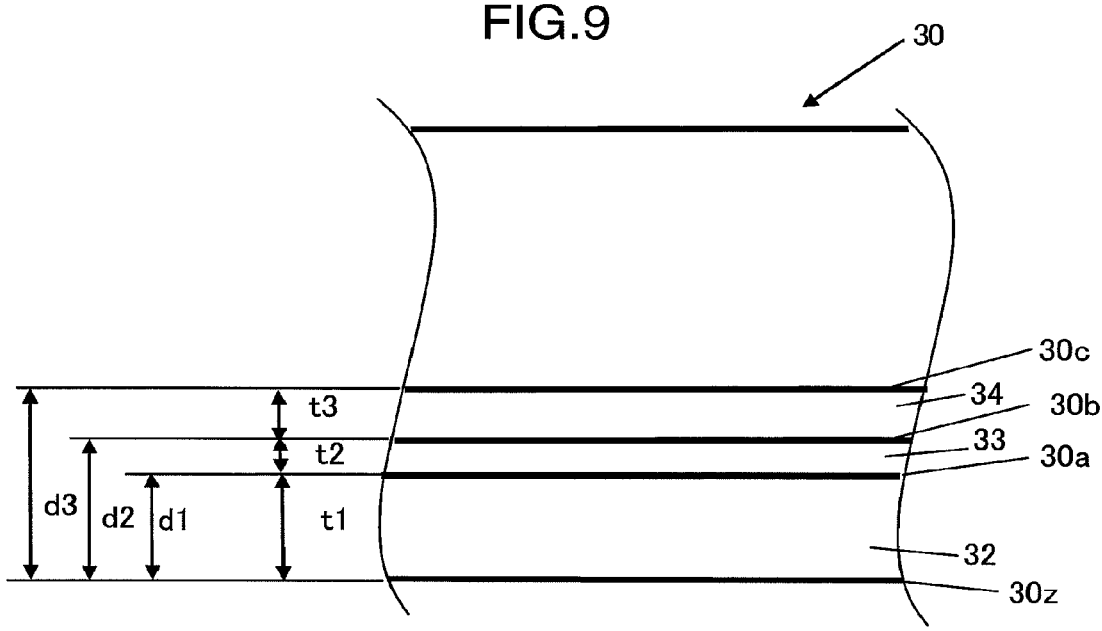
FIG. 9 is a schematic view showing a layer formation of the optical recording medium according to the present invention.

The above description is a specific example of the four-layer disk structure. However, in the case of a three-layer disk shown in FIG. 9, the conditions are as follows:

Condition ①: securing 1 μm or above as the difference between the thickness t1 of a cover layer 32 and the total thickness (t2+t3) of the intermediate layers 33 and 34. |t1−(t2+t3)|≧1 μm, and Condition ②: securing 1 μm or above as the difference between any two values of t1, t2 and t3.

More generally, in a disk having (N−1) layers (N is a natural number more than three), the above conditions are generally to set the difference between the sum of ti to tj and the sum of tk to tm for arbitrary natural numbers i, j, k, m (i≦j<k≦m≦N) to 1 μm or above if a cover-layer thickness and intermediate-layer thicknesses are t1, t2, . . . tN. The cover-layer thickness is the distance between the face of an optical recording medium and the information recording surface closest thereto, thereby similarly meaning that the distance between the face of the optical recording medium and the information recording surface second closest thereto is d2, the distance between the face of the optical recording medium and the information recording surface third closest thereto is d3, the distance between the face of the optical recording medium and the information recording surface fourth closest thereto is d4, . . . .

Moreover, all the intermediate-layer thicknesses≧10 μm in response to the second problem.

So far, the refractive indexes are considered to be equal to a standard value and constant. However, a description will be below given about the case where the refractive indexes are different from a standard value or different for each layer. In the first problem, a back focus occurs because a signal beam and a beam reflected by another layer are similar in size or shape on a photodetector. This back focus can be avoided when the difference in focal position between a signal beam and a beam reflected by another layer must be 1 μm or above in the optical-path directions on the side of the optical recording medium if the refractive indexes are approximately 1.6. In the second problem, adjacent-layer crosstalk occurs when the defocus quantity of a signal beam is below 10 μm on an adjacent track if the refractive indexes are approximately 1.6 μm. The defocus quantity is essential and is equivalent to the size of a beam reflected by another layer or a virtual image of a beam reflected by another layer in a position where a signal beam forms a focal point. The radius thereof is set as RD. A beam reflected by another layer which has the size of RD is projected onto a photodetector, and thereby, the size of interference or crosstalk depends upon the size of RD. The size RD can be said to be a light spread width according to a thickness. The Applicants have found out that in order to avoid a back focus or crosstalk if a refractive index is different from no=1.6, conditions should be devised for equating the defocus quantity or the size of a beam reflected by another layer or a virtual image of a beam reflected by another layer. In other words, the layer thickness can also be converted on the basis of the spread width of a beam according to the thickness.

When the shape thickness of a part having a refractive index nr is dr, conditions for producing the same defocus (the size of a beam reflected by another layer or a virtual image of a beam reflected by another layer) as when the shape thickness of a part having a refractive index no is do is as follows:

$$NA = nr \cdot \sin(\theta r) = no \cdot \sin(\theta o) \quad (1); \text{ and}$$

$$RD = dr \cdot \tan(\theta r) = do \cdot \tan(\theta o) \quad (2).$$

Herein, NA is a numerical aperture when a beam of light converged on the optical recording medium by an objective lens 56, and for example, NA=0.85 or so. θr and θo are a convergent angle of a beam of light inside of a substance having each refractive index, respectively, and sin and tan are a sine function and a tangent function, respectively. From the expression (1), $$\theta r = \arcsin(NA/nr), \theta o = \arcsin(NA/no) \quad (3).$$

Herein, arcsin is an inverse sine function.
From the expression (2), $$do = dr \cdot \tan(\theta r)/\tan(\theta o) \quad (4) \text{ or}$$

$$dr = do \cdot \tan(\theta o)/\tan(\theta r) \quad (5).$$

When the shape thickness of a part having the refractive index nr is dr, in order to derive an equivalent thickness thereof corresponding to the refractive index no, do can be calculated in the expression (4).

Further, in order to equate the shape thickness dr of a part having the refractive index nr with the thickness do corresponding to the refractive index no, dr can be calculated in the expression (5).

Figure 10:
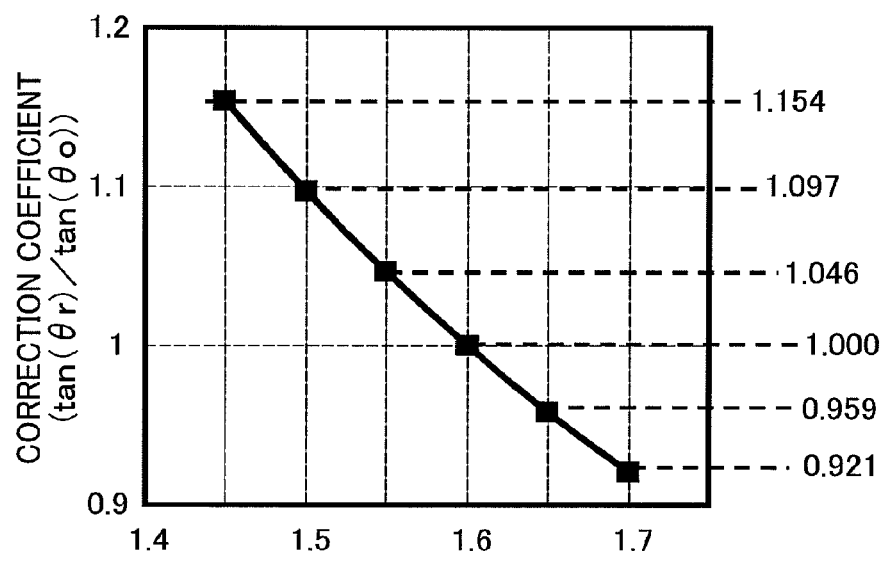
FIG. 10 is a graphical representation showing the refractive-index dependency of a coefficient for converting a shape thickness into a standard refractive index.
Figure 11:
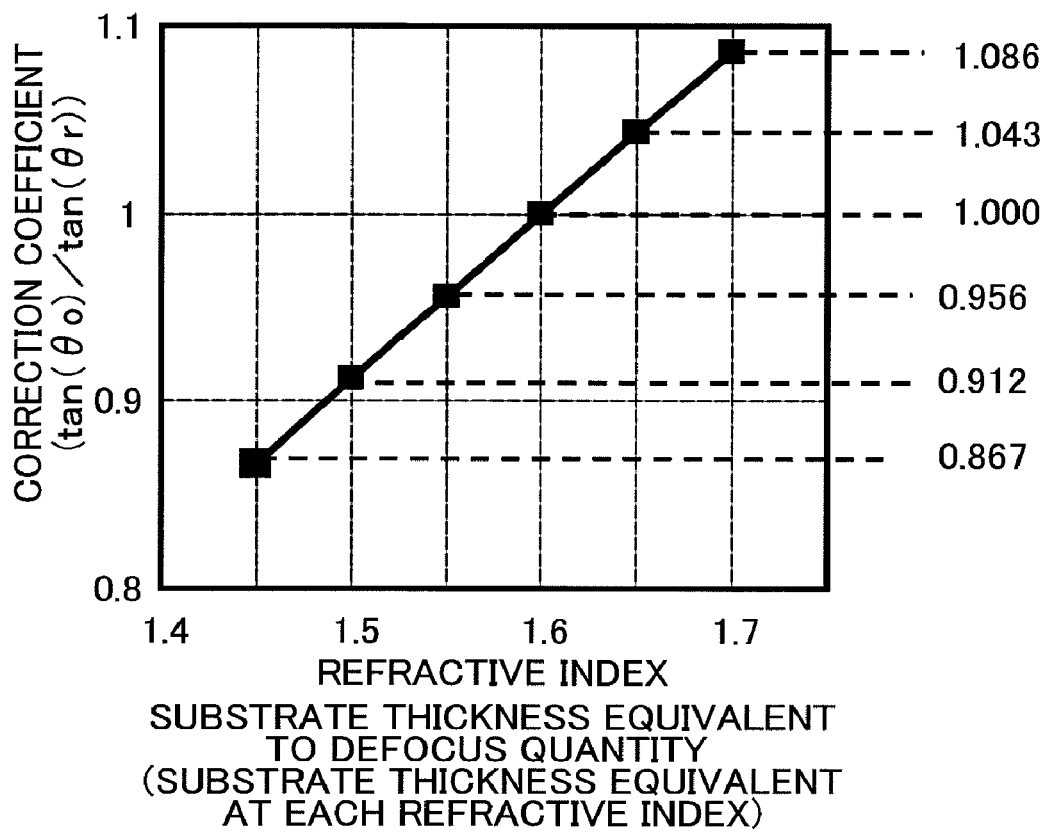
FIG. 11 is a graphical representation showing a conversion coefficient of a thickness corresponding to a standard refractive index into a shape thickness at an actual refractive index.

FIG. 10 shows the coefficient part of the expression (4), or tan(θr)/tan(θo), as a function of the refractive index nr, and FIG. 11 shows the coefficient part of the expression (5), or tan(θo)/tan(θr), as a function of the refractive index nr.

If the refractive index of a predetermined layer is nr(min)≦nr≦nr(max), then in terms of the thickness dr of a part having the refractive index nr, θr(min)=arcsin(NA/nr(min)) and θr(max)=arcsin(NA/nr(max)) are set, and in the same way, the thickness range of an intermediate layer is determined in the expression of dr=do·tan(θo)/tan(θr).

A specific example is given of the relationship between a cover-layer thickness t1 of the above four-layer disk and the sum of the intermediate-layer thicknesses t2 to t4. If the refractive indexes are all no or 1.6 and t1 is 54 μm, t2 is 10 μm, t3 is 21 μm and t4 is 19 μm, then the sum of the intermediate-layer thicknesses t2 to t4 is 50 μm and different by 4 μm than t1, thereby securing 1 μm or above.

However, if the refractive index nr of the cover layer is 1.7, the situation differs even though a shape thickness d1r of the cover layer is 54 μwhich is the same as the above. In order to convert d1r into the thickness t1 in the case where the refractive index is the standard value no, it can be seen from the expression (3) and the expression (4) or FIG. 10 that 0.921 should be multiplied. The thickness t1=0.921×d1r=49.7 μm, which is below 50 μm as the sum of the intermediate-layer thicknesses t2 to t4. In contrast, in order to realize approximately t1=51 μm for securing 1 μm as the difference between thickness of cover layer and the sum of the intermediate-layer thicknesses t2 to t4, it can be seen from the expression (3) and the expression (5) or FIG. 11 that 1.086 should be multiplied. In other words, the calculation of d1r=51×1.086≈55.4 μm should be made, thereby suggesting that the shape cover-layer thickness d1r of the cover layer should be 55.4 μm or above in the case of the refractive index 1.7. This example is merely a predetermined illustration and thus the present invention is not shackled by this value.

Furthermore, in terms of how to determine t1 to tN, the above method is capable of reducing the influence of multilayer stray light possibly produced in a multilayer optical recording medium. Instead of this determining method, however, the present invention can also be applied to an optical recording medium having t1 to tN determined by another method.

Moreover, the thickness of an intermediate layer needs to fulfill specified conditions from another viewpoint. In order to stabilize a focus jump, it is desirable that the thickness of an intermediate layer is within a specified range from a standard value. The focus jump is a motion for shifting the focal position from a recording layer to another recording layer. In order to stably obtain a focus error signal in a layer toward which a focus jump is made, desirably, the quality of a focus error signal should be improved in the layer by moving the collimating lens 53 or executing another such operation before the focus jump. For this purpose, the difference in spherical aberration between the recording layers should be within a specified range.

A difference in the refractive index varies the length of a spherical aberration despite the same thickness, and thus, it is desirable that a target value or a specified tolerance for the thickness of an intermediate layer is also set in such a way that the spherical-aberration length comes within a specified range.

In addition, the present invention is not limited to any of a writable type, a write-once read-multiple type and a ROM type, and thus, can be applied to information recording media of various types.

Figure 12:
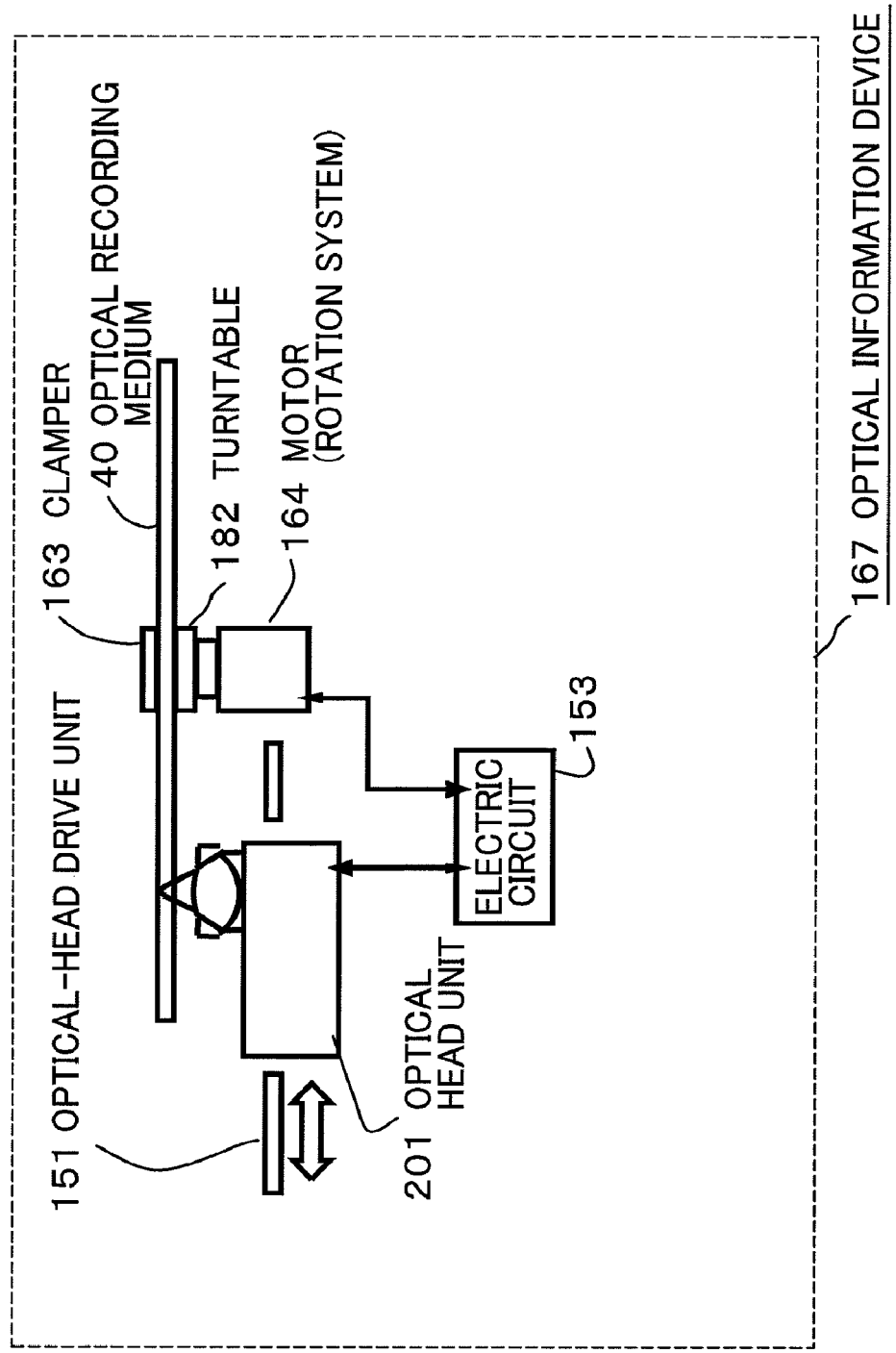
FIG. 12 is a schematic view of an optical information device according to an embodiment of the present invention.
Figure 13:
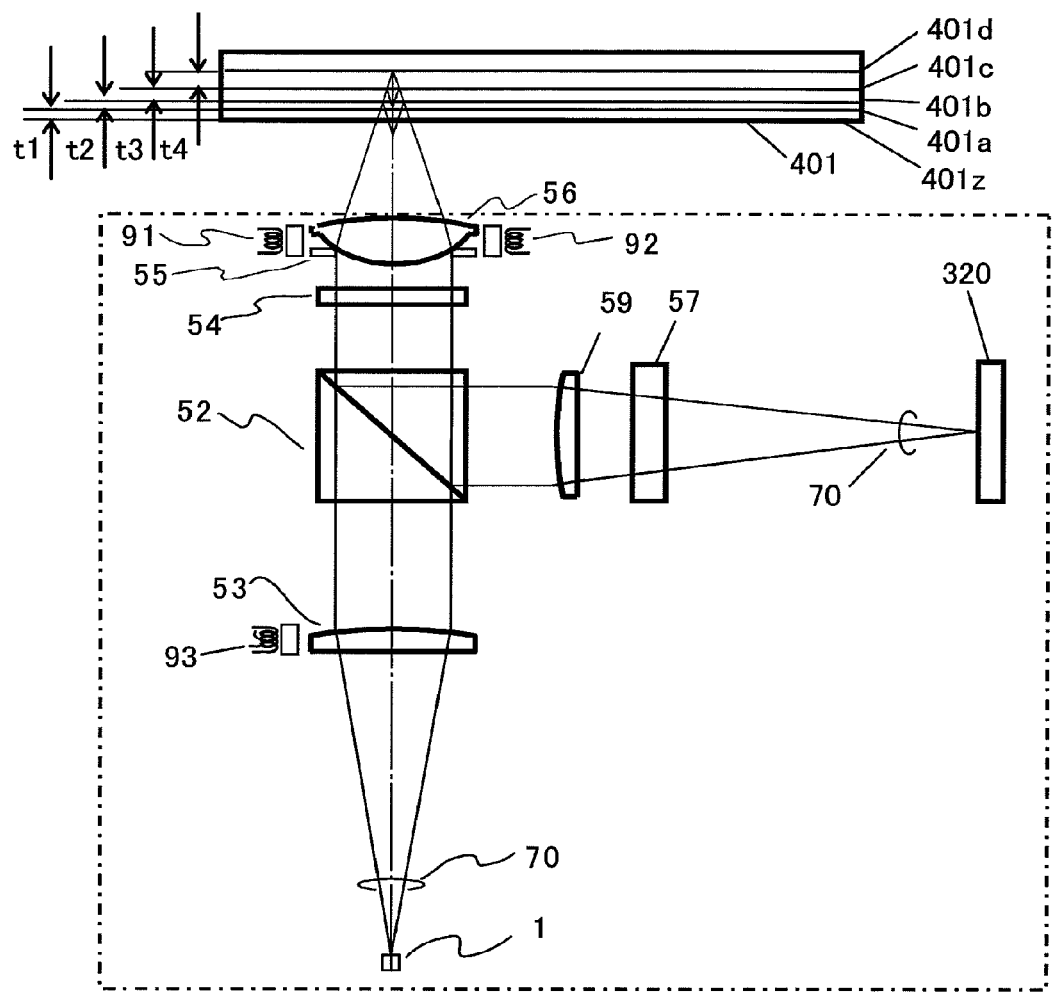
FIG. 13 is a schematic view showing a configuration of an optical recording medium and an optical pickup head unit in a conventional optical information device.

FIG. 12 shows an optical information device making a focus jump.

The optical recording medium 40 is placed on a turntable 182 and rotated by a motor 164. The optical pickup head unit 201 described earlier is coarsely moved up to a track where desired information exits on the optical disk by an optical-head drive unit 151.

In response to the positional relation to the optical recording medium 40, the optical pickup head unit 201 sends a focus error signal or a tracking error signal to an electric circuit 153. In response to this signal, the electric circuit 153 sends a signal for finely moving an objective lens to the optical pickup head unit 201. In accordance with this signal, the optical pickup head unit 201 executes focus control or tracking control for the optical disk, and reads, writes (records) or erases information. The procedure for a focus jump is controlled mainly by the circuit 153.

With respect to the above optical information medium according to the present invention, the optical information device according to this embodiment moves the collimating lens 53 or executes another such operation before a focus jump to thereby correct a spherical aberration produced in an intermediate layer at which the jump is to be made and thereafter shifts the focal position, thereby improving the quality of a focus error signal in a layer toward which the jump is made to stabilize the focus jump.

An optical disk (=optical recording medium) according to the present invention is manufactured based on the following structures or manufacturing methods.

A first manufacturing method for an information recording medium according to the present invention is a manufacturing method for an optical recording medium which has information recording surfaces in (N−1) layers if N is a natural number (more than three), in which: if a cover-layer thickness and intermediate-layer thicknesses are t1, t2, . . . tN, then a difference DFF between the sum of ti to tj and the sum of tk to tm for arbitrary natural numbers i, j, k, m (i≦j<k≦m≦N) is 1 μm or above; and the difference DFF is calculated by converting a shape thickness dr of a part having a refractive index nr different from a standard value no into a thickness do corresponding to the refractive index no which generates the same light-beam spread width as a light-beam spread width at the thickness dr.

Furthermore, a second manufacturing method for an information recording medium according to the present invention is a manufacturing method in which further, if NA is a numerical aperture when light converged on the optical recording medium by an objective lens, θr and θo are a convergent angle of light inside of a substance having the refractive index nr and no, respectively, and sin and tan are a sine function and a tangent function, respectively, then the thickness dr of the part having the refractive index nr is converted into the thickness do of the refractive index no in relational expressions:

$$\theta r = \arcsin(NA/nr); \theta o = \arcsin(NA/no); \text{ and}$$

$$do = dr \cdot \tan(\theta r)/\tan(\theta o).$$

Moreover, a third manufacturing method for an information recording medium according to the present invention is a manufacturing method for an optical recording medium which has information recording surfaces in (N−1) layers if N is a natural number (more than three), in which: if a cover-layer thickness and intermediate-layer thicknesses are t1, t2, . . . tN, then a difference DFF between the sum of ti to tj and the sum of tk to tm for arbitrary natural numbers i, j, k, m (i≦j<k≦m≦N) is 1 μm or above; and a target value for a shape thickness dr of a part having a refractive index nr different from a standard value no is obtained by calculating a thickness do corresponding to the refractive index nr which generates the same light-beam spread width as a light-beam spread width at the thickness do corresponding to the refractive index no.

In addition, a fourth manufacturing method for an information recording medium according to the present invention is a manufacturing method in which further, if NA is a numerical aperture when light converged on the optical recording medium by an objective lens, θr and θo are a convergent angle of light inside of a substance having the refractive index nr and no, respectively, and arcsin and tan are an inverse sine function and a tangent function, respectively, then the thickness do of the part having the refractive index no is converted into the thickness dr of the refractive index nr in relational expressions:

$$\theta r = \arcsin(NA/nr); \theta o = \arcsin(NA/no); \text{ and}$$

$$dr = do \cdot \tan(\theta o)/\tan(\theta r).$$

Furthermore, a fifth manufacturing method for an information recording medium according to the present invention is a manufacturing method in which in the first to fourth manufacturing methods, the intermediate-layer thickness and the refractive index are set in such a way that a spherical aberration is within a specified range.

Moreover, an optical recording medium according to the present invention is an optical recording medium which has three or more recording layers manufactured by the first to fifth manufacturing methods.

In addition, an optical head unit according to the present invention is an optical information device which includes a motor rotating an optical disk, and an electric circuit which receives a signal obtained from the optical head unit and controls and drives the motor, an objective lens or a laser light source, in which for the optical information medium according to the present invention, prior to a focus jump, the electric circuit corrects a spherical aberration generated on an intermediate layer at which the focus jump is to be made and thereafter moves the focal position, thereby improving the quality of a focus error signal in a layer toward which the focus jump is made.

The optical recording medium according to the present invention is capable of preventing a back focus at the face thereof and reducing the interference between beams reflected by each recording surface, thereby improving the quality of a servo signal and a reproductive signal. A guide to designing a thickness according to a refractive index in the optical recording medium becomes obvious, thereby specifically clarifying a guide to the creation of a product.

The multilayer optical disk (optical recording medium) according to the present invention is capable of, even if the refractive index of a cover layer or an intermediate layer is different from a standard value, then minimizing the influence of light reflected by a layer when reproduction is executed for any other layer, thereby reducing the effect on a servo signal and a reproductive signal at an optical head.

This makes it possible to provide an optical disk capable of obtaining a high-quality reproductive signal, having a large capacity and being easily compatible with an existing disk.

Herein, the specific implementation or embodiments given in the section of DETAILED DESCRIPTION OF THE PREFERRED EMBODIMENTS OF THE INVENTION merely clarify the contents of an art according to the present invention, and thus, without being limited only to the specific examples and interpreted in a narrow sense, numerous variations can be implemented within the scope of the spirit of the present invention and the following claims.

The invention claimed is:

1. An optical information device which executes reproduction or recording for an optical recording medium, the optical information device comprising:
   an optical head unit including an objective lens and a laser light source;
   a motor rotating the optical recording medium; and
   an electric circuit which receives a signal obtained from the optical head unit and controls and drives the motor, the objective lens or the laser light source,
   wherein the electric circuit corrects a spherical aberration generated on an intermediate layer between a first surface and a second surface at which the focus jump is to be made and moves a focal position,
   wherein the optical recording medium comprises:
      a first information recording surface closest to a medium surface of the optical recording medium where light is incident;
      a second information recording surface second closest to the medium surface;
      a third information recording surface third closest to the medium surface;
      a cover layer having a refractive index $nr1$ and formed between the medium surface and the first information recording surface;
      a first intermediate layer having a refractive index $nr2$ and formed between the first information recording surface and the second information recording surface; and
      a second intermediate layer having a refractive index $nr3$ and formed between the second information recording surface and the third information recording surface, and
   wherein in a case where actual thicknesses $tr1$, $tr2$, and $tr3$ of the cover layer, the first intermediate layer, and the second intermediate layer are respectively converted into effective thicknesses $t1$, $t2$, and $t3$ of the respective corresponding layers each having a predetermined standard refractive index "no",
      defocus values of both the actual thickness and the effective thickness are the same,
      the effective thicknesses $t1$, $t2$, and $t3$ satisfy $|t1-(t2+t3)| \geq 1$ μm, a difference between any two values of the effective thicknesses $t1$, $t2$, and $t3$ is set to 1 μm or more in any case, and
      the standard refractive index "no" is set to 1.60.

2. The optical information device according to claim 1, wherein the thicknesses of the plurality of intermediate layers and refractive index values of the plurality of intermediate layers of the optical recording medium are set in such a way that a spherical aberration is within a specified range.

3. An optical information device which executes reproduction or recording for an optical recording medium, the optical information device comprising:
   an optical head unit having a collimating lens, an objective lens, and a laser light source;
   a motor rotating the optical recording medium; and
   an electric circuit which receives a signal obtained from the optical head unit and controls and drives the motor, the objective lens or the laser light source,
   wherein at a focus jump, the electric circuit moves the collimating lens to corrects a spherical aberration,
   wherein the optical recording medium comprises:
      a first information recording surface closest to a medium surface of the optical recording medium where light is incident;
      a second information recording surface second closest to the medium surface;
      a third information recording surface third closest to the medium surface;
      a cover layer having a refractive index $nr1$ and formed between the medium surface and the first information recording surface;
      a first intermediate layer having a refractive index $nr2$ and formed between the first information recording surface and the second information recording surface; and
      a second intermediate layer having a refractive index $nr3$ and formed between the second information recording surface and the third information recording surface, and
   wherein in a case where actual thicknesses $tr1$, $tr2$, and $tr3$ of the cover layer, the first intermediate layer, and the second intermediate layer are respectively converted into effective thicknesses $t1$, $t2$, and $t3$ of the respective corresponding layers each having a predetermined standard refractive index "no",
      defocus values of both the actual thicknesses and the effective thicknesses are the same,
      the effective thicknesses $t1$, $t2$, and $t3$ satisfy $|t1-(t2+t3)| \geq 1$ μm, a difference between any two values of the effective thicknesses $t1$, $t2$, and $t3$ is set to 1 μm or more in any case, and
      the standard refractive index "no" is set to 1.60.

4. The optical information device according to claim 3, wherein the thicknesses of the plurality of intermediate layers and refractive index values of the plurality of intermediate layers of the optical recording medium are set in such a way that a spherical aberration is within a specified range.

* * * * *